(12) United States Patent
Thorp

(10) Patent No.: X5344
(45) Date of Patent: Jan. 23, 1829

(54) SPINNING MACHINE

(76) Inventor: John Thorp

John Thorpe.

Letters Patent.

The schedule referred to in these Letters Patent and making part
of the same containing a description in the words of the said John
Thorp. himself of his improvement in the Spinning of filling & Warp
twisted yarn.
This improvement consists in a cup or can placed on the top of a
dead or still Spindle, around the surface of which the yarn revolves
being drawn by the bobbin as it twists & receives it. This cup or can
answers the purpose of the common flyer, in keeping the yarn at
a proper distance from the bobbin, & in guiding & distributing it thro'
. The bobbin may be either a weavers bobbin or a common spin-
-ning bobbin at the option of the manufacturer, and turns on the
spindles receiving its motion from a whirl which also turns on the
spindle & with which it is connected at its base by two pins or
studs extending upward from the whirl & entering two correspond
-ing holes or mortises in the base of the bobbin, The whirl
being banded gives rotative motion to the bobbin, the bobbin
which is similar to the one in common use, excepting that it is
made to steady the spindles, by having the holes thro' which the
spindles pass, of the same size as the spindles. It vibrates like
the bobbin rail in common machines, & on it the whirl is set,
obeying the motion of the rail moving the bobbin up and down
on the spindle & spreading the yarn over the whole length of
the bobbin, the lower edge of the cup or can being the guide
The rail to which the spindles are confined, or what may
be called the spindle rail is a plate of cast iron, In this
rail are screws which exactly fit the spindles, & by which with
the assistance of an eye or clasp bolt, they are kept perfectly
steady, & by these bolts the spindles can easily be adjusted and raised or lowered, so that the lower edge of the cup or can,
which is the guide of the yarn, may suit the filling of the bobbin
The cup or can rests & is hung upon a shoulder at the
top of the spindle, and its cavity is sufficiently large to admit
the bobbin. This can be lifted off & put on again with ease, it
must be taken off to change the bobbins & to mend or piece the yarn
when the bobbin is in the can. In piecing broken ends or in [illegible]
the yarn the bobbin is lifted by the thumb or finger from the pins
or studs that connect it with the whirl, and the whirl is allowed
to run while the yarn is put in a proper position to be mend-
-ed, then the thumb or finger is withdrawn from the bobbin
& it falls to its proper place connecting itself again with the whirl,
When the spindles are placed close to each other, it may be
necessary to surround each cup or can with a cylindrical or semi
-cylindrical tube to prevent the yarns from interfering as
they pass round their respective cans.

Providence Nov.r 10.th 1828.

Witnesses { Wm. Allen
{ Jno. P. Staples }

John Thorp.

United States Patent
Patent No.: X5344
No Printed Specification Available
*Substitute for Original.*
J. THORP.
Machine for Spinning and Twisting.
Patented Dec. 31, 1828.
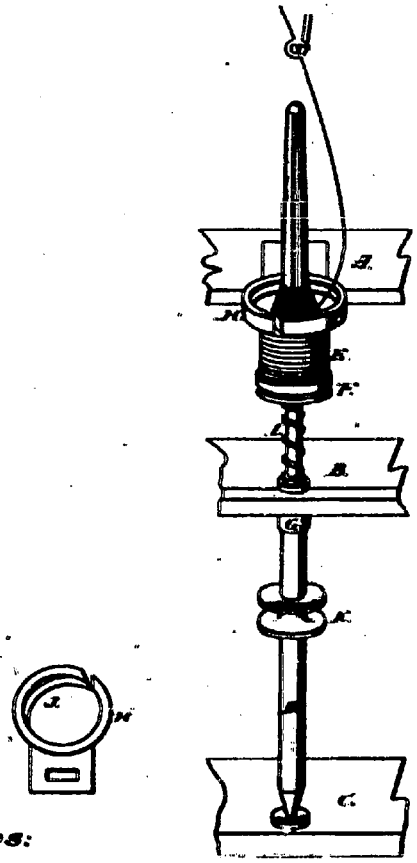
*Witnesses:*
*Inventor*